No. 647,827. Patented Apr. 17, 1900.
N. A. GUILLAUME.
APPARATUS FOR PURIFYING GAS.
(Application filed Dec. 27, 1899.)
(No Model.) 2 Sheets—Sheet 1.
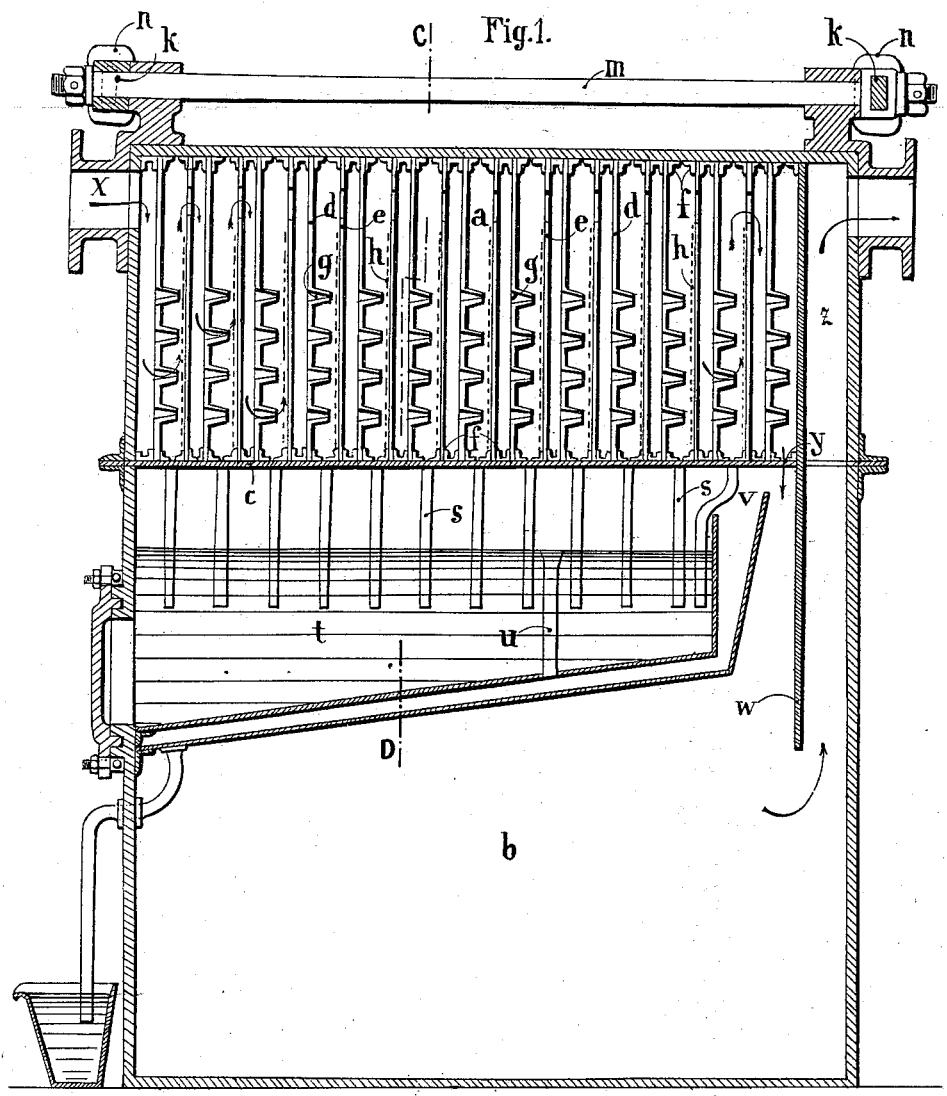

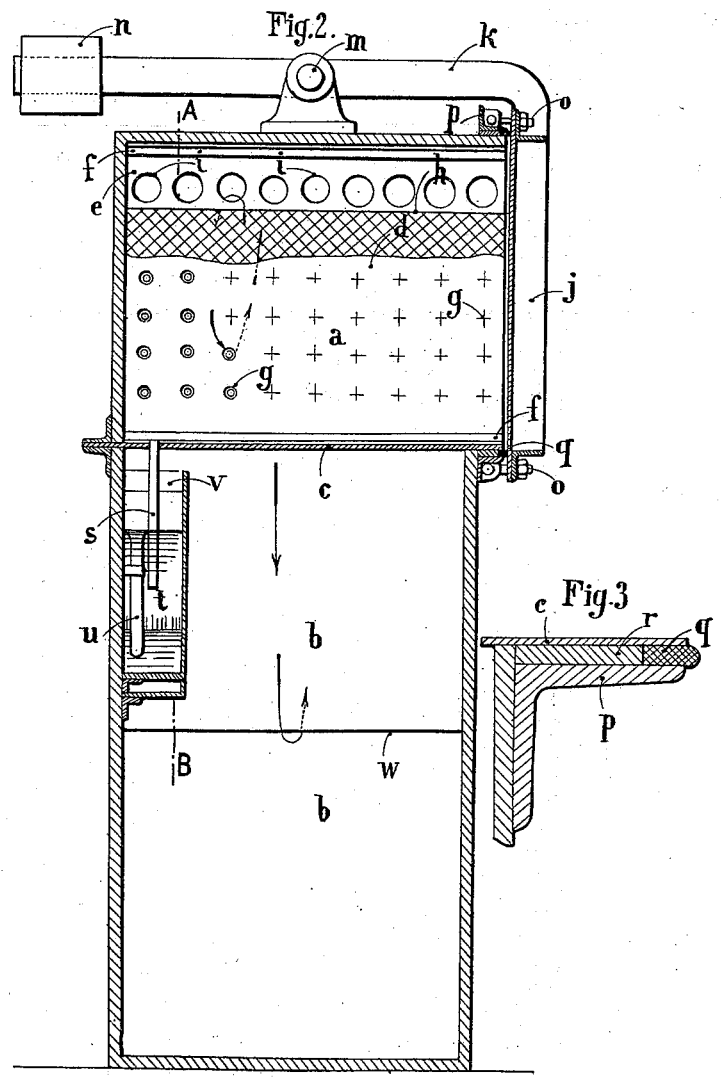

UNITED STATES PATENT OFFICE.

NARCISSE ALEXANDRE GUILLAUME, OF PARIS, FRANCE.

APPARATUS FOR PURIFYING GAS.

SPECIFICATION forming part of Letters Patent No. 647,827, dated April 17, 1900.

Application filed December 27, 1899. Serial No. 741,752. (No model.)

*To all whom it may concern:*

Be it known that I, NARCISSE ALEXANDRE GUILLAUME, a citizen of France, residing at 15 Rue du Louvre, Paris, France, have invented certain new and useful Improvements in Apparatus for Purifying Gas, of which the following is a specification.

My invention relates to apparatus for the purification of gas, more especially intended for use in connection with gas-generators working by suction under the action of a pump or motor.

The purifying apparatus constructed in accordance with my invention is provided with two chambers, one above the other, through which chambers the gas to be purified passes in succession. The upper chamber is for the purifying process and is divided into compartments by two sets of partitions, those of one set being provided with openings and conical nozzles for dividing the gas and those of the other set being corrugated or provided with a covering which will retain liquid and impurities. The gas after traversing these compartments passes from the last of them into the lower chamber, from which it is withdrawn.

Referring to the accompanying drawings, Figure 1 is a longitudinal section of apparatus constructed in accordance with my invention, the section being taken on the line A B of Fig. 2. Fig. 2 is a transverse section on the line C D, Fig. 1; and Fig. 3 shows, drawn to a larger scale, a gas-tight joint which can be advantageously employed in the construction of the apparatus.

$a$ and $b$ are the two chambers aforesaid, separated from each other by the horizontal partition $c$. The upper chamber $a$ is divided into compartments by the plates $d$ and $e$, preferably arranged to slide between guides or angle-irons $f$. The partitions $d$ are provided with openings and nozzles $g$, decreasing from the partition $d$ toward the partition $e$. The partitions $e$ are provided with corrugated surfaces or reticulated, perforated, or equivalently-formed plates $h$ on the side presented to the nozzles, so as to present a large surface against which the gas issuing from the nozzles impinges.

At the upper part of each of the partitions $e$ an opening or openings $i$ is or are formed for the passage of the gas into the adjacent compartment.

The upper chamber $a$ is provided at one side with a cover $j$, fixed to levers $k$, mounted on a shaft $m$ and balanced by counterweights $n$. The said cover $j$ is secured by means of locking-bolts $o$ around its edges. To prevent the escape of gas through the joints of the cover $j$, I employ the arrangement shown in detail in Fig. 3, which consists in fixing between the walls of the chamber $a$ and the angle-irons $p$ an elastic packing $q$, of any suitable material, which extends beyond the edge of the walls and angle-irons and is kept in position by a filling-piece $r$. When the bolts $o$ are screwed up, the packing $q$ is compressed and the escape of gas prevented by the tight joint thus formed.

The liquid and impurities entering with the gas are arrested in each compartment of the chamber $a$ by the corrugated partitions $e$ or reticulated, perforated, or other plates $h$ and pass downward and through pipes $s$ into a reservoir $t$, arranged on one side of the lower chamber $b$. These pipes $s$ close the direct passage of the gas from one chamber to the other and to secure this should dip into a sufficient quantity of liquid in the reservoir $t$.

$u$ is an overflow-pipe for regulating the level of liquid in the reservoir $t$ and conducting the excess of liquid by suitable conduits, as shown in Fig. 1, to outside the apparatus.

$v$ is an auxiliary passage to regulate the outflow of the liquid. The gas enters the apparatus at the inlet $x$ to the first compartment of the upper chamber $a$ and passes successively through the several compartments thereof, as indicated by the arrows, and as it passes through the nozzles $g$ of the partitions $d$ of the one set it strikes against the corrugated partitions $e$ of the other set or the sheets $h$ thereof applied thereto, which intercept the liquid and impurities. The gas passes from compartment to compartment by the openings $i$ into each compartment successively and after repeated impacts reaches the last compartment completely purified, in the bottom of which compartment are openings $y$, forming a direct communication between the chambers $a$ and $b$. The gases pass by the said openings $y$ into the lower chamber $b$, which constitutes a reservoir and is provided with a depending and elastic partition $w$, so that this chamber acts to a certain extent as a gas pocket or bag. A discharge-outlet $z$ for the gas leads up from the said lower chamber to outside the apparatus.

Having now particularly described and ascertained the nature of my said invention and in what manner the same is to be performed, I declare that what I claim is—

1. In an apparatus for the purification of gas, the combination with a chamber, of a series of perforated plates in said chamber, having nozzles, and a series of corrugated partitions alternating with said perforated plates, substantially as described.

2. In an apparatus for the purification of gas, the combination with an upper chamber, of a series of perforated plates having nozzles, a series of corrugated partitions alternating with said perforated plates, a lower chamber communicating with the upper, and an overflow-passage in said lower chamber, substantially as described.

3. In an apparatus for the purification of gas, the combination of a series of perforated plates having nozzles, a series of corrugated partitions alternating with said plates, and a communicating lower chamber having elastic walls, substantially as described.

In testimony whereof I have hereunto set my hand in presence of two subscribing witnesses.

NARCISSE ALEXANDRE GUILLAUME.

Witnesses:
 EDWARD P. MACLEAN,
 HIPPOLYTE JOTTE.